O. A. OWEN.
MOTION PICTURE STAGE ILLUSION.
APPLICATION FILED DEC. 29, 1919.

1,395,513.

Patented Nov. 1, 1921.

2 SHEETS—SHEET 1.

Inventor:
Ole A. Owen
By M. H. Longbridge
Attorney.

UNITED STATES PATENT OFFICE.

OLE ANDREW OWEN, OF BRADLEY BEACH, NEW JERSEY.

MOTION-PICTURE STAGE ILLUSION.

1,395,513.  Specification of Letters Patent.  Patented Nov. 1, 1921.

Application filed December 29, 1919. Serial No. 348,218.

*To all whom it may concern:*

Be it known that I, OLE ANDREW OWEN, a citizen of the United States, and resident of Bradley Beach, in the county of Monmouth and State of New Jersey, have invented certain new and useful Motion-Picture Stage Illusions, of which the following is a specification.

Figure 1:
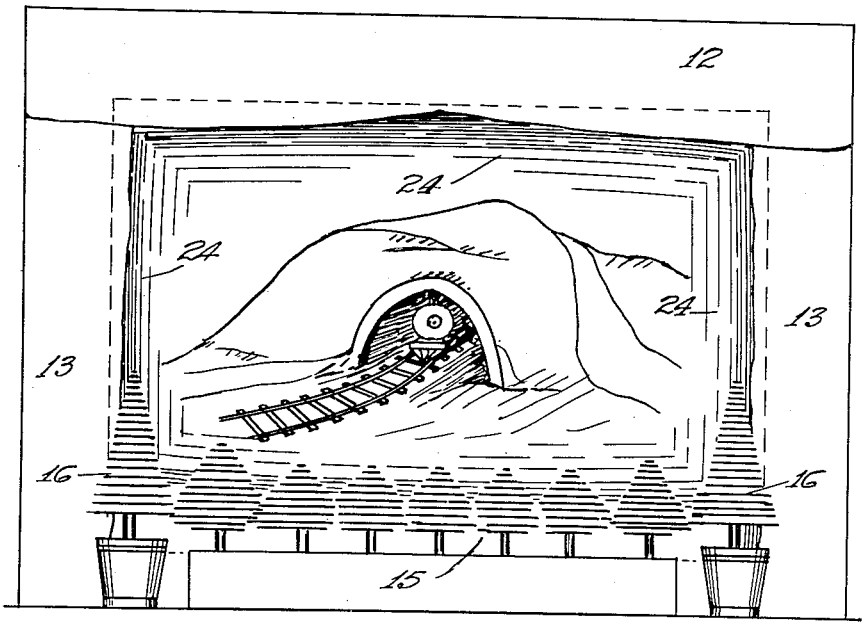
Figure 2:
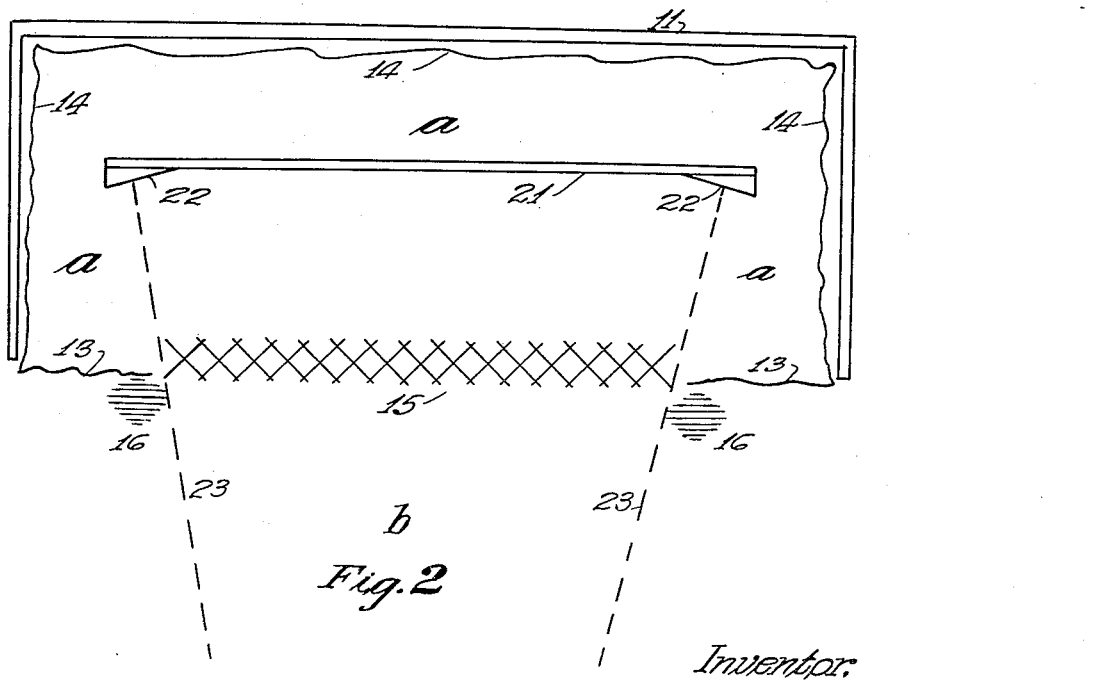
Figure 3:
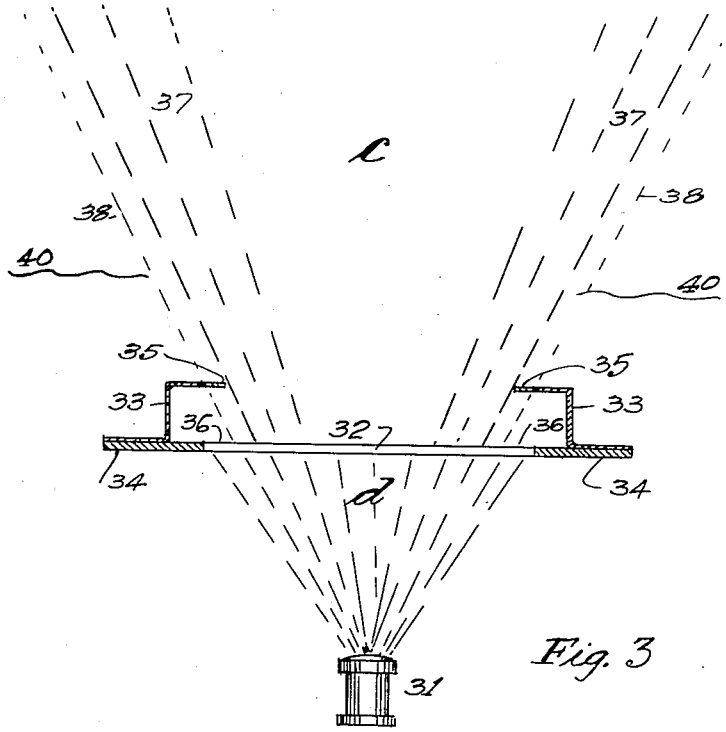
Figure 4:
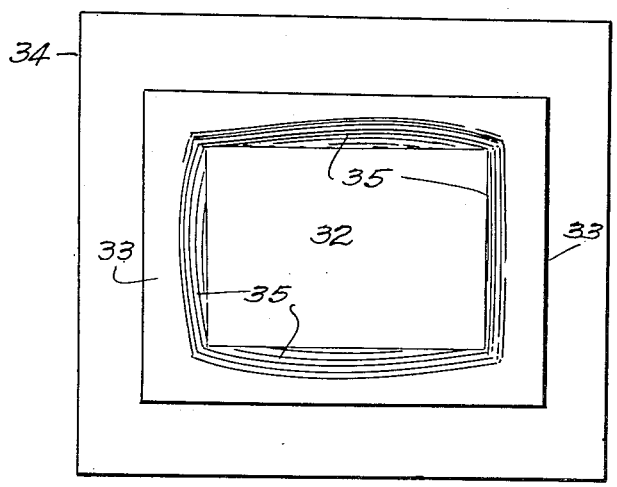

This invention relates to moving picture screens and more particularly to a stage effect produced in combination with moving pictures and has for an object to produce the illusion on the spectators of pictures in apparent stereoscopic relief. Other objects will appear from the following specification and drawings in which Figure 1 is a front view of a moving picture screen arranged according to my invention, Fig. 2 is a corresponding plan view of Fig. 1. Fig. 3 is a plan view arranged for back projection including my invention and Fig. 4 is a corresponding elevation looking from the front.

Motion picture screens are usually provided with a frame around the picture and give to the spectators the suggestion that the scene is a picture scene on a flat surface. The leading idea in the present invention is to remove the suggestion of a flat surface by removing the sharp edges of the picture itself and to give it an effect such as if the picture were suspended and viewed through a tube. The action in the motion picture itself where one object moves behind another conveys to the spectators the idea of solidity in the picture. This effect however, due to the method of screen display in a picture frame is counteracted and the spectator has constantly before him a reminder that he is viewing a picture on a flat surface. The objects of the present invention are to remove all impressions of a flat surface and leave the action in the picture to convey the illusion of solidity.

In the drawings 11 represents the stage inclosure, 12 represents a drapery hung from the top and 13 represents side draperies, while 14 represents an interior drapery of the stage inclosure. All of these draperies are preferably made from light absorbing material, such as dark velvet. 15 represents a row of box trees or corresponding shrubbery having an irregular contour. These merge into the larger box trees 16 at the sides. 21 represents the usual form of picture screen which is provided with deflected edges 22 shown in Fig. 2. 24, Fig. 1 indicates vignetted edges for the screen 21. These edges it will be noted are colored lightly at the reflecting surface of the screen and gradually darken toward the outer edge until they blend with the color of the light absorbing screen, in this way producing a blending effect which gradually disappears into the stage inclosure. In addition this coloring is not applied in straight lines but varies in depth with the object of eliminating straight lines and sharply defined edges.

The stage inclosure represented by *a* is entirely darkened, the audience is located in the space *b* and the extreme line of the rays of the projecting machine is indicated by 23. These light rays it will be noted overlap on the vignetted edges of the screen itself as indicated at 22. This combination gives to the spectator the suggestion that the scene of the picture projected on the screen is located at a distance. The surrounding irregular edges indicate that part of the vision is obstructed and the scene itself conveys the illusion of solid pictures. It has been found by experiments that the side draperies and particularly the top draperies when sustained a considerable distance in front of the screen aid very materially to this illusion. The deflected edges 22 have the effect of deflecting the light toward the center. Fig. 3 is arranged for back projection, the light from the projector lens 31 falls on the ground glass screen 32 with the spread of light indicated at *d*. The front of the screen 34 is provided with a shadow box 33, preferably darkened on the inside which obstructs the light rays 37 from the picture as shown and produces a vignetted effect. In addition, I provide opaque glass around the edges of the shadow box as indicated at 35. This glass may be irregular in contour and varied in density. This will allow partially obscured light rays 38 from the edge of the picture and produces a blending effect from light to shade around the picture. It will be noted that the spread of light *d* is greater than the portion of the screen that is ordinarily visible from *c* as indicated at 36. An effect similar to the shadow box may be obtained and in fact may be reproduced by the draperies 40, Fig. 3, which obscure the edge of the picture as indicated.

Having thus described my invention, I claim:

1. In combination, a stage inclosure draped with light absorbing materials, a screen for motion pictures suspended within said inclosure, said screen provided with beveled edges and having a color blending with said draperies, the front of said inclosure provided with an aperture smaller than said screen and bordered on the bottom side with a row of box plants.

2. In combination, a stage inclosure draped with light absorbing materials, a screen for motion pictures suspended within and spaced from the front of said inclosure, said screen provided with beveled edges and having a color blending with said draperies, the front of said inclosure provided with an aperture smaller than said screen and having a border with an irregular contour.

Signed at New York, in the county of New York and State of New York, this 24th day of December, A. D. 1919.

OLE ANDREW OWEN.